United States Patent [19]
Zimmerbeutel et al.

[11] Patent Number: 6,135,492
[45] Date of Patent: Oct. 24, 2000

[54] AIR BAG MODULE

[75] Inventors: Bernd Uwe Zimmerbeutel, Remscheid; Ludger B. Meyenbrock, Wuppertal; Michael Heinz Jokuszies, Stuttgart, all of Germany

[73] Assignee: Delphi Technologies, Inc., Troy, Mich.

[21] Appl. No.: 09/246,459

[22] Filed: Feb. 9, 1999

[30] Foreign Application Priority Data

Feb. 14, 1998 [GB] United Kingdom .................. 9803123

[51] Int. Cl.⁷ .................................................. B60R 21/28
[52] U.S. Cl. ..................................... 280/730.2; 280/728.2
[58] Field of Search ............................. 280/730.2, 728.2

[56] References Cited

U.S. PATENT DOCUMENTS

| | | |
|---|---|---|
| 3,807,755 | 4/1974 | Mason, Jr. . |
| 5,094,475 | 3/1992 | Olsson et al. .......................... 280/730.2 |
| 5,362,097 | 11/1994 | Barske ................................. 280/730.2 |
| 5,921,575 | 7/1999 | Kretschmer et al. ................. 280/730.2 |

FOREIGN PATENT DOCUMENTS

| | | |
|---|---|---|
| 0663325 | 7/1995 | European Pat. Off. . |
| 1277440 | 6/1972 | United Kingdom . |
| 1340549 | 12/1973 | United Kingdom . |
| 1370441 | 10/1974 | United Kingdom . |
| 1370772 | 10/1974 | United Kingdom . |
| 1386422 | 3/1975 | United Kingdom . |
| 2314300 | 12/1997 | United Kingdom . |
| WO93/18942 | 9/1993 | WIPO . |

*Primary Examiner*—Kenneth R. Rice
*Attorney, Agent, or Firm*—Kathryn A. Marra

[57] ABSTRACT

An air bag module (10) for attachment to the roof of a motor vehicle comprising a longitudinally extending air bag (12) which is securable to the roof; an inflator (14) which is securable to the roof adjacent the air bag; and a longitudinally extending conduit (16) positioned inside the air bag, extending through an opening (26) in the air bag, and attached at one end (28,48) to the inflator, the conduit having a number of apertures (42) formed therein at predetermined positions along its length for the discharge of inflator gas from the inflator into the air bag.

11 Claims, 3 Drawing Sheets

AIR BAG MODULE

TECHNICAL FIELD

The present invention relates to an air bag module for a motor vehicle, and in particular to an air bag module which can be mounted in the roof of a motor vehicle.

BACKGROUND OF THE INVENTION

Air bag modules for motor vehicles are well known. Such modules include an inflator for discharging inflator gas and an air bag for inflation by the discharged gas from the inflator. U.S. Pat. No. 5,605,346 describes a module in which inflator gas is directed from the inflator to the air bag by way of a conduit having apertures at one end positioned inside the air bag for the discharge of the inflator gas into the air bag.

SUMMARY OF THE INVENTION

An air bag module in accordance with the present invention for attachment to the roof of a motor vehicle comprises a longitudinally extending air bag which is securable to the roof; an inflator which is securable to the roof adjacent the air bag; and a longitudinally extending conduit positioned inside the air bag, extending through an opening in the air bag, and attached at one end to the inflator, the conduit having a number of apertures formed therein at predetermined positions along its length for the discharge of inflator gas from the inflator into the air bag.

The present invention provides an air bag module for mounting in the roof of a motor vehicle.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
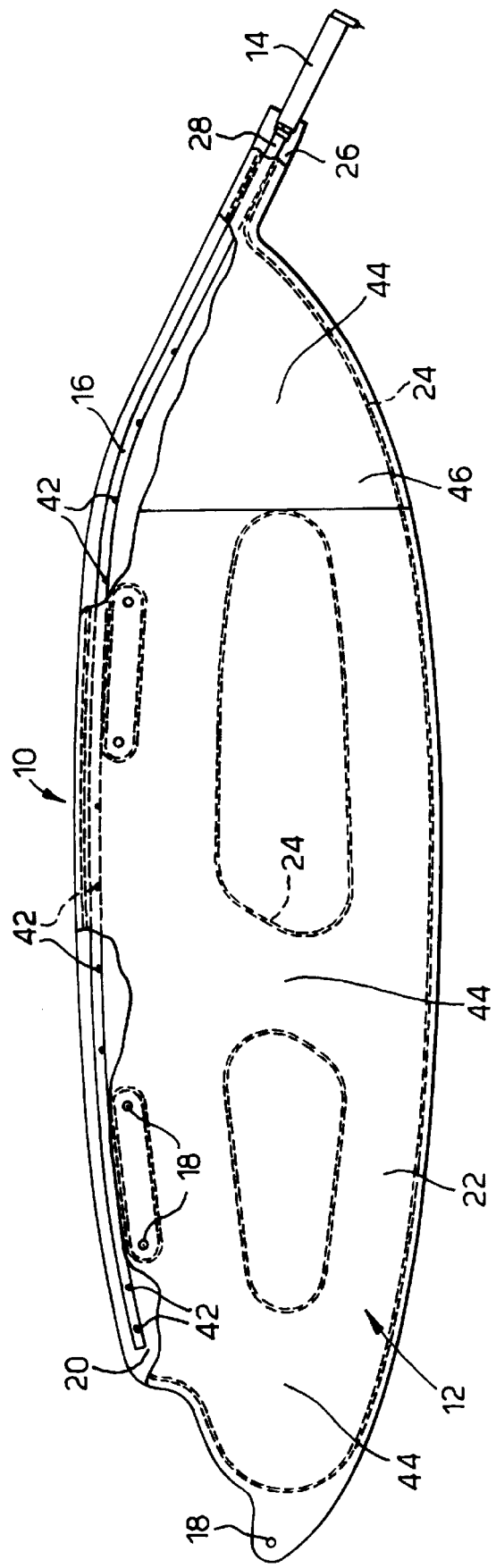
FIG. 1 is a side view of an air bag module in accordance with the present invention with parts of the front portion of the air bag cut away to reveal the conduit.

Referring to FIG. 1, the air bag module 10 of the present invention comprises an air bag 12, an inflator 14, and a conduit 16. The air bag 12 is secured to the roof (not shown) of a motor vehicle by way of screws (not shown) or other suitable fastening means which extend through mounting apertures 18 formed in the air bag. The air bag 12 is secured to the vehicle roof above the side doors of the vehicle to provide protection for the side of the head of a vehicle occupant during a collision. The air bag 12 comprises a base portion 20 for positioning against the roof, and a front portion 22 which is secured to the base portion along seams 24.

The air bag 12 extends longitudinally and has an opening 26 at one end which is preferably tubular as shown in FIG. 1. The conduit 16 is positioned inside the air bag 12 between the front portion 22 and the rear portion 20. The conduit 16 extends longitudinally and passes into or through the tubular opening 26 in the air bag 12. The internal diameter of the tubular opening 26 and the external diameter of the conduit 16 are preferably substantially the same to provide a close fit between the conduit and the air bag 12 at the opening.

Figure 2:
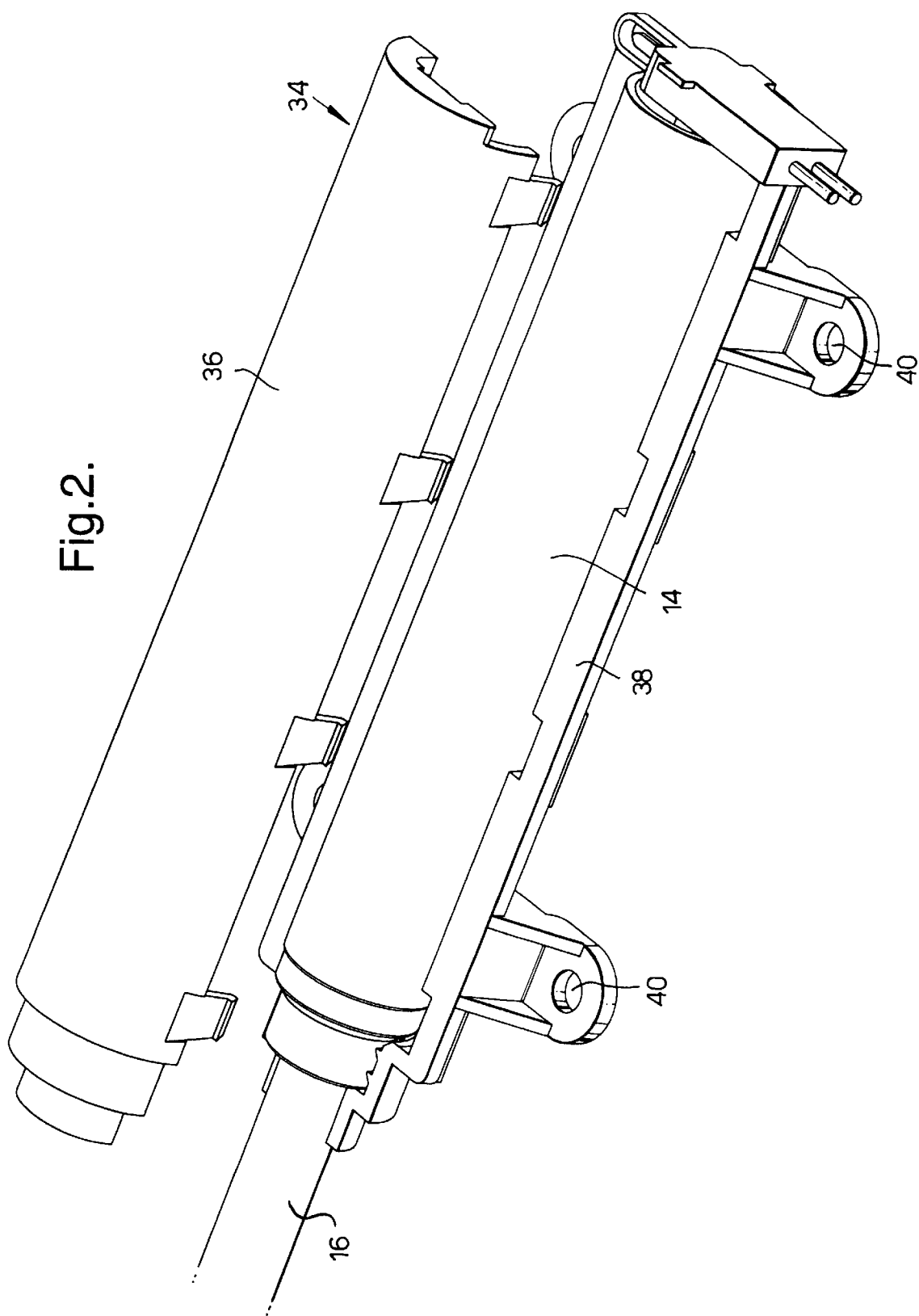
FIG. 2 is an enlarged side view of the inflator, securing means for the inflator, and the end of the conduit, of the air bag module of FIG. 1.
Figure 3:
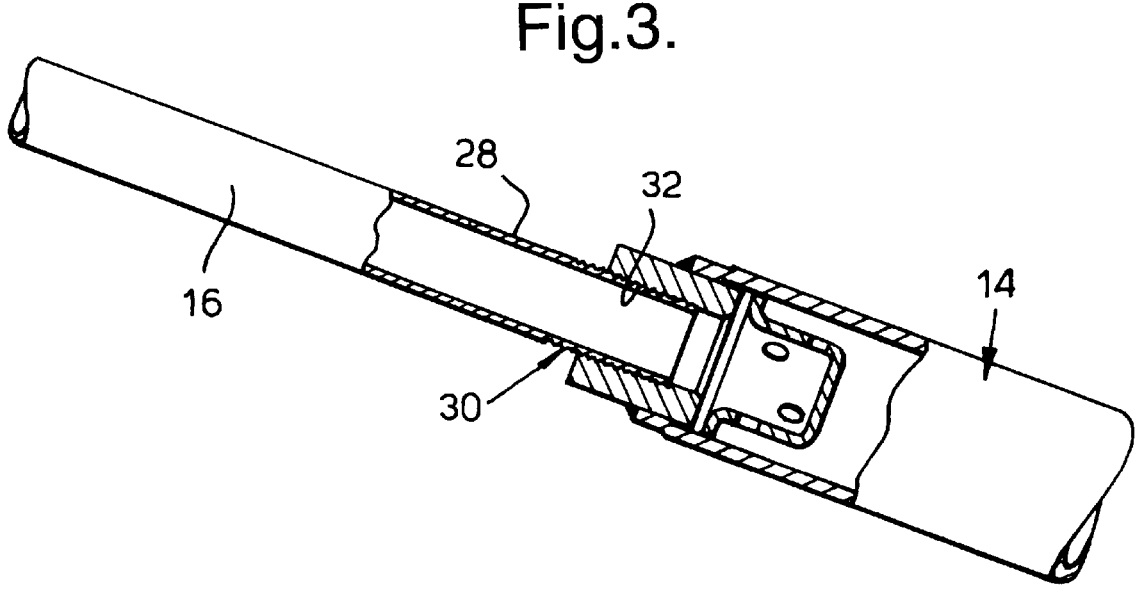
FIG. 3 is an enlarged view, partly in cross-section, of the screw threaded connection between the inflator and the conduit of the air bag module of FIG. 1.

The end 28 of the conduit 16 at the opening 26 is attached to the inflator 14 by an external screw thread 30 on the conduit threading on an internal screw thread 32 on the inflator, as shown in FIG. 3. The screw thread connection 30,32 between the inflator 14 and the conduit 16 is preferably positioned inside the tubular opening 26 in the air bag 12. The inflator 14 is secured to the roof of the motor vehicle adjacent the air bag 12 preferably using a housing 34 as shown in FIG. 2. The housing 34 comprises two parts 36,38 which make a snap fit together to secure the inflator 14 in the housing. One of the parts 38 is secured to the roof by screws (not shown) or other suitable fastening devices which extend through mounting apertures 40 formed in the one part of the housing 34. The control of the operation of the inflator 14 to discharge inflator gas will not be described in detail and can be any suitable means known to those skilled in the art. Operation of the inflator 14 discharges inflator gas into the conduit 16.

The conduit 16 has a number of apertures 42 formed therein at predetermined positions along its length. The apertures 42 are positioned to deliver inflator gas from the inflator 14 to predetermined areas 44 within the air bag 12. The predetermined areas 44 are those areas most likely to be positioned adjacent the head of a vehicle occupant. Each aperture 42 preferably has a predetermined diameter in order to control the rate of inflation of the areas 44 of the air bag 12 by the discharging inflator gas from the inflator 14.

The air bag 12 preferably has an internal or external heat shield 46 positioned adjacent the inflator 14 to provide protection for the air bag from any heat that is generated during discharge of inflator gas from the inflator.

Figure 4:
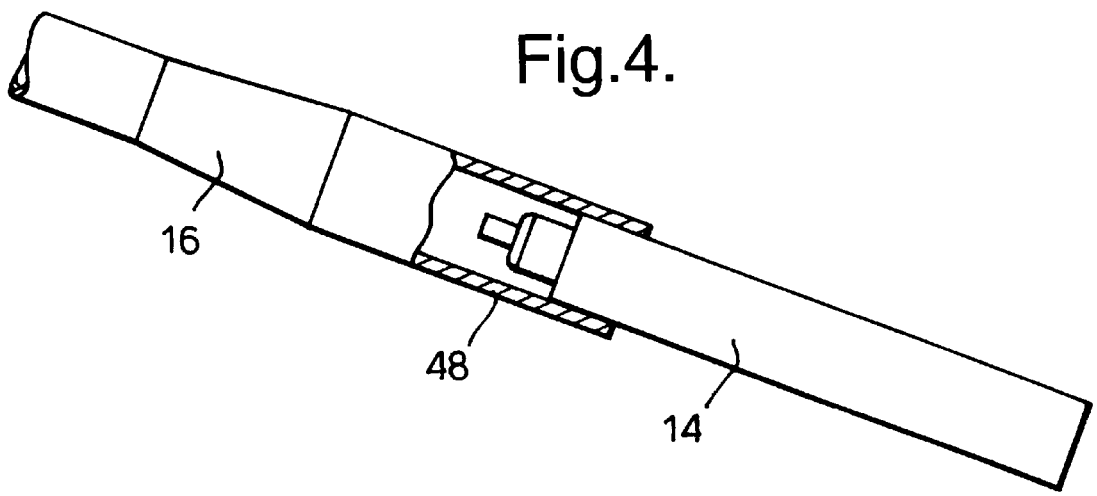
FIG. 4 is an enlarged view, partly in cross-section, of an alternative (push-fit) connection between the inflator and the conduit of an air bag module in accordance with the present invention.

In an alternative arrangement shown in FIG. 4, the screw thread connection between the inflator 14 and the conduit 16 is replaced by a push-fit between the inflator and the conduit, the end 48 of the conduit being expanded to make the push fit on the inflator.

What is claimed is:

1. An air bag module for attachment to the roof of a motor vehicle comprising:

a longitudinally extending air bag which is securable in direct mounting relation to the roof by a plurality of mounting apertures integral to the air bag and disposed along the length of the air bag, the air bag having an air bag opening;

an inflator which is securable to the roof adjacent the air bag; and a longitudinally extending conduit positioned inside the air bag and extending through the air bag opening, the conduit having one end attached to the inflator, the conduit having a number of apertures formed therein at predetermined positions along its length for the discharge of inflator gas from the inflator into the air bag.

2. The air bag module as claimed in claim 1, wherein the conduit is attached at the one end to the inflator by a screw thread connection.

3. The air bag module as claimed in claim 1, wherein the conduit is attached at the one end to the inflator by a push-fit connection.

4. The air bag module as claimed in claim 1, wherein the air bag opening is tubular and makes a close fit with the conduit.

5. The air bag module as claimed in claim 4, wherein the attachment of the conduit to the inflator is positioned in the tubular air bag opening.

6. The air bag module as claimed in claim 1 wherein the air bag includes a heat shield positioned adjacent the opening.

7. The air bag module as claimed in claim 1, wherein the apertures in the conduit have a predetermined diameter.

8. An air bag module for attachment to the roof of a motor vehicle comprising:

a longitudinally extending air bag which is securable in direct mounting relation to the roof by a plurality of mounting apertures integral to the air bag and disposed along the length of the air bag, the air bag having an air bag opening;

an inflator which is securable to the roof adjacent the air bag;

a longitudinally extending conduit positioned inside the air bag and extending through the air bag opening, the conduit having one end attached to the inflator, the conduit having a number of apertures formed therein at predetermined positions along its length for the discharge of inflator gas from the inflator into the air bag; and the air bag opening being tubular and closely fitting with the conduit, and the attachment of the conduit to the inflator being positioned in the tubular air bag opening.

9. The air bag module as claimed in claim 8, wherein the conduit is attached at the one end to the inflator by a screw thread connection.

10. The air bag module as claimed in claim 8, wherein the conduit is attached at the one end to the inflator by a push-fit connection.

11. The air bag module as claimed in claim 8 wherein the air bag includes a heat shield positioned adjacent the opening.

* * * * *